United States Patent [19]
Yamanaka et al.

[11] Patent Number: 5,904,951
[45] Date of Patent: May 18, 1999

[54] CENTRIFUGAL TUMBLING GRANULATING-COATING APPARATUS, METHOD OF GRANULATING AND COATING POWDER OR GRANULAR MATERIAL BY USE OF THE APPARATUS

[75] Inventors: Kuniaki Yamanaka, Hamamatsu; Kiyoshi Nishiyama, Shizuoka; Narimichi Takei, Hamamatsu, all of Japan

[73] Assignee: Freund Industrial Co., Ltd., Tokyo, Japan

[21] Appl. No.: 08/955,337

[22] Filed: Oct. 21, 1997

[30] Foreign Application Priority Data

Nov. 5, 1996 [JP] Japan ................... 8-292975

[51] Int. Cl.$^6$ ........................ B05D 1/00
[52] U.S. Cl. ............... 427/2.14; 427/212; 427/240; 427/242; 118/19; 118/20; 118/52; 118/58; 118/303; 118/417; 118/418
[58] Field of Search ................. 118/19, 20, 52, 118/58, 417, 418, 303; 366/251, 314, 317; 427/2.14, 212, 240, 242

[56] References Cited

U.S. PATENT DOCUMENTS

| | | | |
|---|---|---|---|
| 4,581,242 | 4/1986 | Forster | 118/19 |
| 4,740,390 | 4/1988 | Külling | 118/303 |
| 4,967,688 | 11/1990 | Funakoshi et al. | 118/303 |

*Primary Examiner*—Laura Edwards
*Attorney, Agent, or Firm*—McCormick, Paulding & Huber

[57] ABSTRACT

A centrifugal tumbling granulating-coating apparatus for spherically granulating and coating pharmaceuticals, foods and the like. The apparatus is constructed such that an annular outer portion 5b of a rotary disc 5 is formed to provide an inclined portion which is inclined downwardly toward the center, the size (P) of the outer portion 5b in the horizontal direction is within the range of $P \geq 0.25D$ to the diameter (D) and preferably $0.4D \geq P \geq 0.25D$, and the height (H) is within the range of $0.1D \leq H \leq 0.33D$ and preferably $0.1D \leq H \leq 0.25D$.

14 Claims, 8 Drawing Sheets

CENTRIFUGAL TUMBLING GRANULATING-COATING APPARATUS, METHOD OF GRANULATING AND COATING POWDER OR GRANULAR MATERIAL BY USE OF THE APPARATUS

BACKGROUND OF THE INVENTION

1. Field of the Invention

The present invention relates to a centrifugal tumbling granulating-coating apparatus, method of granulating and coating a powder or granular material by use of the apparatus, and more particularly to a technique of a centrifugal tumbling granulating-coating, in which spherical granulating of pharmaceuticals, foods and the like or coating on spherical granules is performed.

2. Related Art Statement

A centrifugal tumbling granulating-coating apparatus (hereinafter referred to a "CF apparatus"), in which a powder or granular material is centrifugally tumbled to produce spherical granules or is applied as a coating to spherical granules, is represented, for example, by "a centrifugal fluidized coating-granulating apparatus—CF-GRANULATOR" manufactured by Freund Industrial Co., Ltd., which is broadly sold on the market, and the construction thereof is shown in FIG. 5. In a CF apparatus 67 as shown in FIG. 5, a peripheral edge portion of a rotary disc 64 is positioned close to a side wall thereof through a small radius of curvature, whereby the powder or granular material tumbled with a centrifugal force increases friction loss in energy when it is tumbled in the vertical direction, and the tumbling action of the powder or granular material at a fixed wall is decreased, so that the upper limit of a charge amount is suppressed.

Now, from the beginning, the CF apparatus was developed to be mainly used for coating tablets and the like. However, recently, the CF apparatus is mainly used for spherically granulating or making coating layers of medicine and the like on the surfaces of spherical granules.

In these uses, it is required that spherical granules of good sphericalness are manufactured with high yield so as to be included within a predetermined range of grain size, and uniform coating layers are provided on the spherical granules. Then, in order to meet the above-described requirements, various proposals have heretofore been made for the construction and shape of the CF apparatus.

Namely, as an effective CF apparatus for coating the tablets and the like, in "a method and a apparatus for coating" as shown in Japanese Patent Publication No. 22544/1971 for example, there is described a rotary disc 24 rotatable horizontally is provided in the central portion, a curved speed reducing portion 25 provided around the rotary disc 24 and a coating pan 27 formed of a cylindrical portion 26 connected to the curved speed reducing portion 25 as shown in FIG. 6. Furthermore, in "a method and a apparatus for coating" as shown in Japanese Patent Publication No. 10878/1971, there is described a coating pan 37 including a rotary disc 34 rotatable horizontally and a curved fixed wall 35 surrounding the rotary disc 34 as shown in FIG. 7.

Further, as a CF apparatus effective for spherical granulation and the like, in "a apparatus for automatically coating particles" as shown in Japanese Patent Publication Publication No. 992/1979, there is described a apparatus for automatically coating powder 47, in which moisture in the coating apparatus is measured by a moisture detector to control feed rates of binding solution and drying hot air as shown in FIG. 8. Furthermore, in a thesis for a degree "compression molding and granulation of drugs" submitted by Mr. Yoshiro Funakoshi in Tohoku University, there is described a centrifugal tumbling type coating apparatus 57, in which a fixed wall 55 is curved inwardly, as shown in FIG. 9.

A throughput capacity for the powder or granular material, which is considered as a standard in CF apparatuses sold on the market at present is 30–50 kg on the product finishing base in a machine type, in which the diameter of the rotary disc is 1000 mm for example. In a case where an amount more than this is charged, the powder or granular material cannot be centrifugally tumbled satisfactorily, so that particles satisfactory in sphericalness cannot be produced. Then, the limit of the throughput capacity in these CF apparatuses has been accepted as one unavoidable, which is characteristic of CF apparatuses.

On the other hand, in recent years, the batch capacity has been increased due to the large-sized apparatuses for manufacturing pharmaceuticals and the like, and necessity for increasing the batch capacity of the CF apparatuses has been voiced by the market. Here, unless the specification of the CF apparatuses sold on the market is not freed from restraint, in order to meet this requirement, a further large-sized CF apparatus should be provided.

However, in the CF apparatus, in order to prevent the powder or granular material on the rotary disc from falling, it is required that a slit for ventilation provided between the side wall and the rotary disc is kept narrow and uniform width, so that it is very difficult to make the apparatus large-sized from the viewpoint of precision in working. Then, at present, the above-described requirement is met by providing a multiplicity of CF apparatuses while putting up with the increase in costs and areas of installation. And, the above-described limit of the throughput capacity cannot be dissolved by the above-described various proposals.

We analysed the conventional CF apparatuses from the viewpoint that whether the above-described limit of the throughput capacity can be cleared or not by effectively acting the centrifugal force for tumbling the powder or granular materials onto the individual particles. As a result, we knew that the configuration of the CF apparatus which has been known heretofore cannot satisfactorily utilize the action of the centrifugal force, and, in order to improve this, proposed a centrifugal tumbling granulating-coating apparatus 71 as disclosed in Japanese Patent Laid-Open Publication No. 232049/1995 (FIG. 10).

The centrifugal tumbling granulating-coating apparatus 71 as shown in the aforesaid Patent Laid-Open Publication No. 232049/1995 is constructed such that a rotary disc 75 has a peripheral edge portion 75b curved upwardly from a plain bottom surface portion 75a in a circularly arcuate shape in a vertical cross-section, so that the throughput capacity can be improved greatly. However, in this apparatus, since the radius of curvature R of the peripheral edge portion is as small as less than 0.25 of a diameter D of the rotary disc 75 as shown in FIG. 10, there has been found a problem that the treated powder or granular material is adhered to this portion and accumulated thereon.

This peripheral edge portion 75b is suitable for effectively acting the centrifugal force onto the powder or granular material when the powder or granular material to be treated is centrifugally tumbled, and it has been cleared by us that it is necessary to determine the shape of the rotary disc 75 to be free from adhesion and accumulation of the powder or granular material.

SUMMARY OF THE INVENTION

Then, it is an object of the present invention to provide a technique of preventing the powder or granular material to be treated from being adhered and accumulated to a rotary disc of a centrifugal tumbling granulating-coating apparatus.

It is another object of the present invention to provide a technique of granulating and coating for satisfactorily obtaining the effective centrifugal force for centrifugally tumbling the powder or granular material to be treated on the rotary disc and for efficiently manufacturing products.

It is a further object of the present invention to provide a technique of granulating and coating, which is capable of obtaining granulated and coated products of high quality.

The above-described and other objects, and novel features of the present invention will become apparent more fully from description of the present specification in conjunction with the accompanying drawings.

The following is brief description of outlines of the typical ones out of the inventions disclosed according to the present invention.

That is, the centrifugal tumbling granulating-coating apparatus according to the present invention comprises a rotary disc rotatable horizontally by a rotatably driving means and a cylindrical fixed wall provided at the outside of the aforesaid rotary disc at a predetermined width and having a substantially vertical powder contact portion being in contact with the powder or granular material during the centrifugal tumbling. In a vertical cross-section of the aforesaid rotary disc, the whole or an outer portion, whose size (P) in the horizontal direction is within the range of $P \geqq 20.25D$ to a diameter (D) thereof, is formed to provide an inclined portion inclined downwardly toward the center, and a height (H) of the inclined portion is within the range of $0.1D \leqq H \leqq 0.33D$ to the aforesaid diameter (D).

Furthermore, in the apparatus according to the present invention, the height (H) of the inclined portion, i.e., the outer portion of the rotary disc may be preferably within the range of $0.1D \leqq 0.25D$ to the diameter (D).

Further, the outer portion (P) of the rotary disc may be preferably within the range of $0.4D \geqq P \geqq 0.25D$ to the diameter (D).

The inclined portion, i.e., the outer portion of the rotary disc may be straight-lined or downwardly convexed circularly arcuate shape having a radius of curvature (R) of $R \geqq 0.5D$ and preferably $R \geqq D$.

The rotary disc may be constituted by the aforesaid outer portion and a central portion at the inside thereof, i.e., a bottom surface portion. The bottom surface portion may be horizontal.

The rotary disc may have a raised portion at the center thereof. This raised portion may be fixed to the other portion of the rotary disc through a screw, bolt and the like, or may be formed integrally on the other portion of the rotary disc.

Further, the whole of the rotary disc may be formed to provide an inverted cone downwardly inclined toward the center.

The method of granulating the powder or granular material according to the present invention is performed such that the powder or granular material is charged into the aforesaid centrifugal tumbling granulating-coating apparatus, a solution of binding agent, or a solution of binding agent and the powder or granular material are fed while the aforesaid rotary disc is rotated, so that the charged powder or granular materials are bounded with each other or the charged powder or granular material is bonded with the thus fed powder material. Granulation may be performed while gas is fed through a slit formed between the rotary disc and the fixed wall.

The method of coating the powder or granular material according to the present invention is performed such that the powder or granular material is charged into the aforesaid centrifugal tumbling granulating-coating apparatus, a solution of coating agent, or a solution of coating agent and the powder material are fed while the aforesaid rotary disc is rotated, and coating layers are formed on particles of the powder or granular material. In this case also, coating may be performed while gas is fed through the slit formed between the rotary disc and the fixed wall.

In the centrifugal tumbling granulating-coating apparatus according to the present invention, in the vertical cross-section of the aforesaid rotary disc, the whole or a part of the outer portion, which is more than ½ of the diameter, is a substantially straight-lined inclined portion, which is downwardly inclined toward the center. If the size of this inclined portion, i.e., the outer portion in the horizontal direction is short, in order to effectively act the centrifugal force necessary for tumbling the powder or granular material at the fixed wall portion, it is unavoidable that the outer portion has an acute angle or is of an arcuate shape with a small radius of curvature, with the result that adhesion and accumulation of the powder or granular material easily take place.

On the other hand, it is effective that the height of the inclined portion is within the range of 0.1–0.33 of the diameter of the rotary disc. When this is smaller than 0.1, the effective utilization of the centrifugal force is unsatisfactory, and, when this is over 0.33, adhesion and accumulation of the powder or granular material easily take place. The straight-lined inclined portion is most satisfactory for avoiding adhesion. However, as for the transmission of the centrifugal force to the powder or granular material at the fixed wall portion, a somewhat circularly arcuate shape convexed downwardly is effective. The radius of curvature of this circularly arcuate shape may be more than 0.5 of the diameter and preferably be more than the diameter. If the radius of curvature is less than the diameter and particularly less than 0.5 of the diameter, then adhesion and accumulation of the powder or granular material take place easily.

Furthermore, the raised portion provided at the central portion of the rotary disc of the apparatus according to the present invention moves the powder or granular material positioned at about the center of the rotary disc to the outer portion and has a function of tumbling the powder or granular material by the inclined side surface thereof. However, the shape thereof is not particularly limited to a circular conical shape, frusto-conical shape, semi-spherical shape and the like. The size of the raised portion may be less than ½ of the diameter of the rotary disc. If the size is larger than this, then the area of the tumbling region of the powder or granular material becomes smaller, which is not preferable.

It is not necessary that the various portions including the outer portion, the central portion, the raised portion and the like of the rotary disc of the apparatus according to the present invention are defined from each other by clear border lines, and it would be better that these various portions are smoothly connected to each other by providing suitably curved transferring portions in order to prevent the powder or granular material on the borders from being adhered and accumulated and to facilitate cleaning. Furthermore, it is not necessary that the circularly arcuate portion is strictly circularly arcuate and may have an inconstant radius of curvature like a part of an oval. In this case, the radius of curvature is represented an average value of the whole circularly arcuate shape.

Furthermore, since it is necessary to make the diameter of the rotary disc large as much as possible, the powder contact portion of the fixed wall is made substantially vertical. However, it does not exclude that this is formed to provide a slightly curved portion to the extent where the connection with the rotary disc is made smooth. Further, as for the shape of a portion of the fixed wall other than the powder contact portion, this portion has no influence to the centrifugal tumbling action of the powder or granular material, any optional shape can be adopted, and, for example, this portion may be connected to a bag filter receiving portion having an enlarged diameter like a fluidized bed type granulating apparatus. However, as described above, the powder contact portion is required to be substantially vertical. For example, making the top portion thereof formed to provide an inwardly curved surface produces a frictional resistance when the powder or granular material is pushed upwardly, and moreover, a volume for receiving the powder or granular material is decreased, so that it is not preferable.

It is usual that the apparatus according to the present invention comprises a spray gun for feeding a solution of binding agent and/or a solution of coating agent and a powder feeding device for feeding powder. Furthermore, the apparatus may be constructed such that the gas is fed through the aforesaid slit to prevent the powder or granular material from falling through the slit formed between the aforesaid rotary disc and the aforesaid fixed wall, to facilitate tumbling the powder or granular material, and to accomplish its drying function.

DETAILED DESCRIPTION OF THE PREFERRED EMBODIMENTS

Detailed description will hereunder be given of the embodiment of the present invention with reference to the accompanying drawings.

Figure 1:
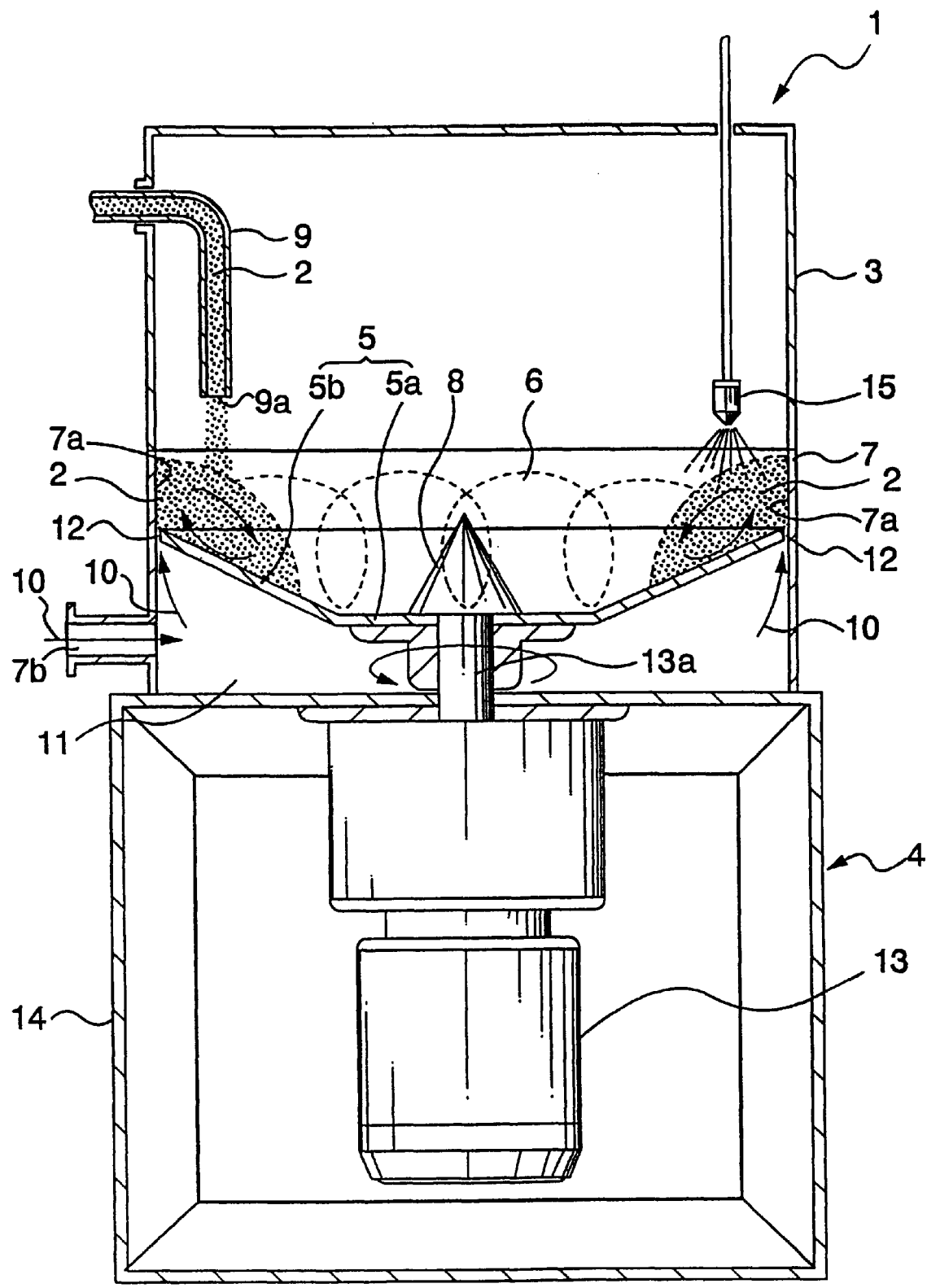
FIG. 1 is a sectional view showing one embodiment of the centrifugal tumbling granulating-coating apparatus according to the present invention.
Figure 2:
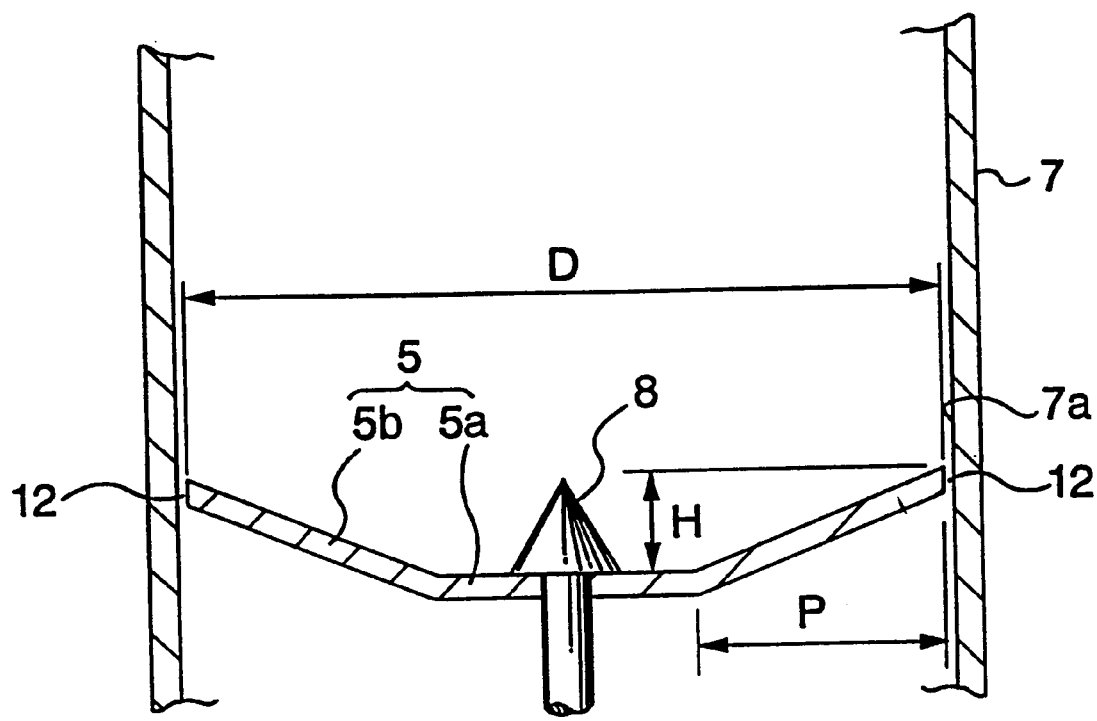
FIG. 2 is a sectional view showing the essential portions of the centrifugal tumbling granulating-coating apparatus as shown in FIG. 1, FIGS. 3(a) to 3(d) are schematic sectional views showing other embodiments of the rotary disc used in the present invention.

FIG. 1 is the sectional view showing an embodiment 1 of the centrifugal tumbling granulating-coating apparatus according to the present invention, and FIG. 2 is the sectional view showing the essential portions of the centrifugal tumbling granulating-coating apparatus.

As shown in FIG. 1, in this embodiment of a centrifugal tumbling granulating-coating apparatus 1, a powder or granular material 2 is centrifugally tumbled and a solution of a binding agent and powder are added to the powder or granular material 2 at a predetermined speed, spherical granules and the like are granulated by using the powder as cores or binding the powder materials together, the powder and the binding agent are added to the spherical granules while the spherical granules are centrifugally tumbled, and coating layers are formed thereon. The apparatus comprises a centrifugally tumbling section 3 positioned upwardly and a rotatably driving section 4 positioned downwardly.

In the centrifugal tumbling section 3, there is provided a rotary disc 5 for centrifugally tumbling the powder or granular material 2 to form a centrifugal tumbling chamber 6, and a cylindrical stator (fixed wall) 7 providing a housing is placed surrounding the rotary disc 5 with a predetermined annular slit or gap therebetween.

The rotary disc 5 includes a plain (i.e. flat) central portion 5a positioned at the center and an annular outer portion 5b providing an inclined portion which is inclined straight-linedly downwardly toward the center at the outer periphery of this central portion 5a. As shown in FIG. 2, in a vertical cross-section of the rotary disc 5, a size (P) of the outer portion 5b in the horizontal direction is within the range of $P \geq 0.25D$ ($2P \geq \frac{1}{2}D$) to the whole or the diameter of the rotary disc 5. The size (P) of the outer portion 5b of the rotary disc 5 in the horizontal direction is preferably within the range of $0.4D \geq P \geq 0.25D$ to the diameter (D). If the size (P) of the outer portion 5b in the horizontal direction is too short, then, in order to effectively act the centrifugal force necessary for tumbling the powder or granular material 2 at the fixed wall portion of the stator, it is unavoidable that the outer portion 5b adopts a sharp inclination, so that adhesion and accumulation of the powder or granular material take place.

Furthermore, a height (H) of the outer portion 5b, i.e., the inclined portion of the rotary disc 5 is within the range of $0.1D \leq H \leq 0/33D$ to the diameter (D). To state in detail, the height (H) of the outer portion 5b, i.e., the inclined portion of the rotary disc 5 is preferably within the range of $0.1D \leq H \leq 0.25D$ to the diameter (D). If the height (H) is less than 0.1 of the diameter (D), then, the effective utilization of the centrifugal force of the rotary disc 5 is not performed satisfactorily, and, if it exceeds 0.33, then, adhesion and accumulation of the powder or granular material 2 onto the outer portion 5b take place.

Incidentally, a conical raised portion 8 is formed at the center of the central portion 5a of the rotary disc 5, whereby the rotary disc 5 is prevented from being distorted to secure the strength, and the powder or granular material being about at the center is actively moved toward the outer portion 5b where the centrifugal tumbling is performed.

A feeding pipe 9 for feeding the powder or granular material 2 to the rotary disc 5 is provided from a position upwardly of the centrifugal tumbling chamber 6 with a discharging opening 9a being faced to the rotary disc 5. Further, a spray nozzle 15 of two- or three-fluid construction for spraying the binding agent and the powder, which are stored in a tank, not shown, onto the powder or granular material 2.

Out of an inner wall portion of the stator 7, a portion for contacting the powder or granular material 2 during the centrifugal tumbling, i.e., a powder contact portion 7a is made substantially vertical to the central portion 5a of the rotary disc 5, whereby the powder or granular material 2 centrifugally tumbled by the rotary disc 5 is pushed upwardly along the powder contact portion 7a without being exposed to an excessive resistance. The stator 7 is provided therein with an air supply port 7b for taking air 10 into a fluid chamber 11 formed under the rotary disc 5. Then, the thus taken-in air 10 is introduced from the fluid chamber 11 through an annular slit 12 for ventilation, which is formed between the rotary disc 5 and the stator 7, into the centrifugal tumbling chamber 6. Accordingly, by the introduction of the air 10, the powder or granular material is prevented from falling through the annular slit 12 formed between the rotary disc 5 and the stator 7 and drying of the powder or granular material 2 can be facilitated by this air 10.

In the rotatably driving section 4, a motor (rotatably driving means) 13 for rotating the rotary disc 5 is disposed in a casing 14. A shaft 13a of this motor 13 is connected to a rotatable center shaft of the rotary disc 5, whereby the rotary disc 5 is rotated in the horizontal direction.

Next, action of this embodiment will be described.

Firstly, a predetermined quantity of the powder or granular material 2 as being a core material to be treated is charged through a charging opening 9a of the feed pipe 9 onto the rotary disc 5 in the centrifugally tumbling chamber 6 of the centrifugal tumbling granulating-coating apparatus 1. The rotary disc 5 is rotated by the motor 13 to centrifugally tumble the powder or granular material 2 on the rotary disc 5, and the air is fed from the air supply port 7b, through the fluid chamber 11 into the centrifugal tumbling chamber 6 via the annular slit 12 for feeding air.

On the other hand, the binding agent and the powder are fed onto the powder or granular material 2 being treated in the centrifugal tumbling chamber 6 from the spray nozzle 15.

With this arrangement, the powder or granular material 2 is centrifugally tumbled on the rotary disc 5 in the centrifugally tumbling chamber 6 and the binding agent and the powder are fed to the powder or granular material 2 in a state of being centrifugally tumbled, so that spherical granules can be granulated and coated.

In this embodiment, the rotary disc 5 has the annular outer portion 5b providing the inclined portion on the outer periphery of the plain central portion, and moreover, the size (P) of this outer portion 5b in the horizontal direction is within the range of $P \geq 0.25D$ to the diameter (D) and preferably with in the range of $0.1D \leq H \leq 0.25D$, so that the centrifugal force of the rotary disc 5 can be fully utilized and the powder or granular material 2 can be effectively tumbled on the outer portion 5b of the rotary disc 5.

As the result, according to this embodiment, the powder or granular material 2 is not adhered and accumulated onto the outer portion 5b of the rotary disc 5, so that desirable spherical granule products can be manufactured efficiently.

FIGS. 3(a) to 3(d) are the schematic sectional views showing other embodiments of the rotary disc used in the present invention.

Figure 3A:
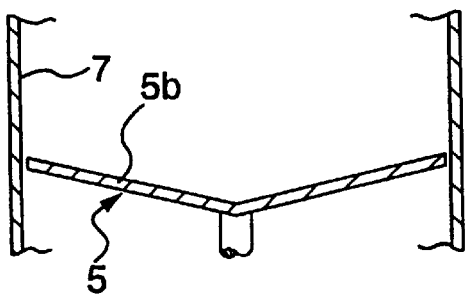

Firstly, the rotary disc 5 shown in FIG. 3(a) has no central portion 5a having the horizontal or flat surface and the rotary disc 5 is formed to provide a so-called inverted conical shape which is inclined straight-linedly downwardly toward the center with the whole of the rotary disc 5 being tumbled into the straight-linedly inclined outer portion 5b. Furthermore, the raised portion 8 is not provided at the central portion of the rotary disc 5. In this form, the powder or granular material 2 can be prevented from being adhered and accumulated to the whole surface of the rotary disc 5, and moreover, efficient granulating and coating can be performed by use of the wholly inclined portion.

Figure 3B:
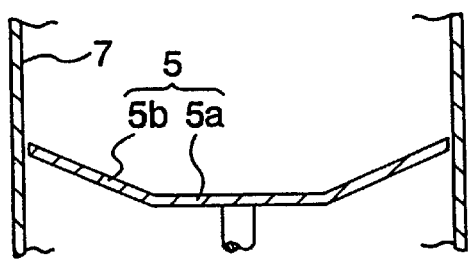

Next, in the form shown in FIG. 3(b), the raised portion 8 is not provided at the center of the central portion 5a of the rotary disc 5.

Figure 3C:
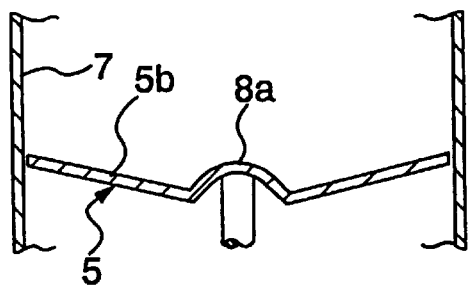

Furthermore, in the form shown in FIG. 3(c), the central portion itself of the rotary disc 5 is not of a horizontal or flat surface, and a new raised portion 8a, having a bowl shape convexed upwardly, is formed integrally with the other portion of the rotary disc 5, so that the strength can be increased without providing a separate raised portion 8.

Figure 3D:
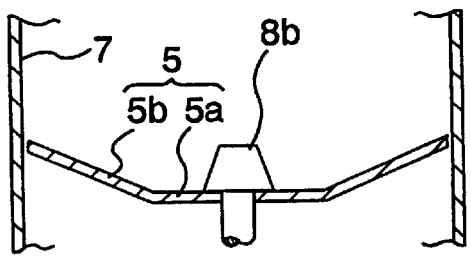

Further, in the form shown in FIG. 3(d), the raised portion 8b is not conical, but is a frusto-conical shape.

In these forms shown in FIGS. 3(a) to 3(d) also, such a desirable functional effect can be obtained that the powder or granular material is not adhered and accumulated and so forth.

Figure 4:
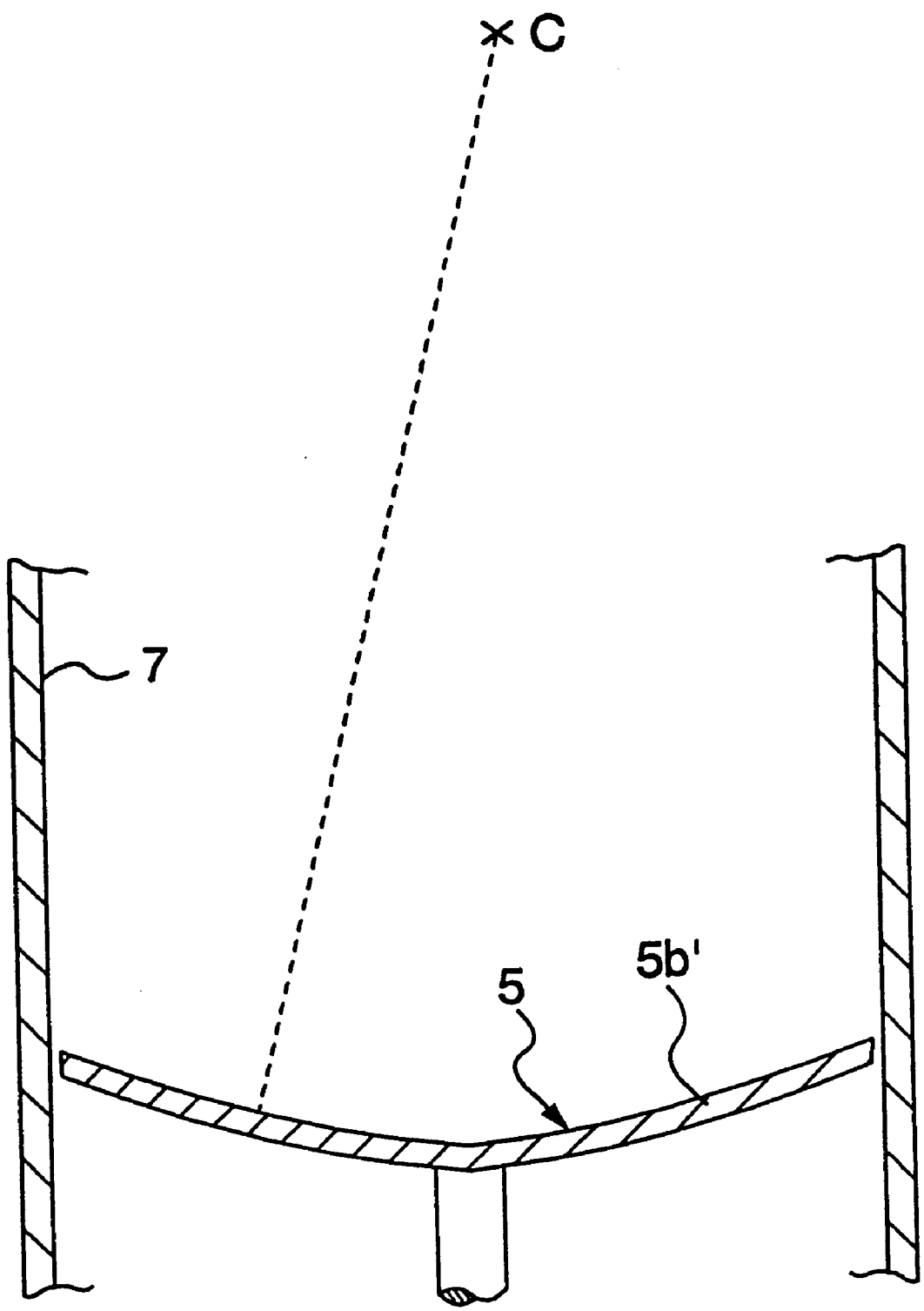
FIG. 4 is a schematic sectional view showing a further embodiment of the rotary disc used in the present invention.

FIG. 4 is the schematic sectional view showing a further embodiment of the rotary disc used in the present invention.

In this embodiment, similarly to FIG. 3(a), the rotary disc 5 does not have the plain central portion 5a and the raised portion 8, and an outer portion 5b' is not straight-lined, but is an inclined portion having a circularly arcuate shape convexed downwardly.

Furthermore, a radius of curvature (R) of this outer portion 5b' is formed such that a distance from a center C of a circularly arcuate shape is larger than the diameter (D) of the rotary disc 5. In any way, this radius of curvature (R) is within the range of $R \geq 0.5D$, and preferably $R \geq D$.

In this embodiment also, such a desirable functional effect can be obtained that the powder or granular material is not adhered and accumulated onto the outer portion 5b' of the rotary disc 5 and so forth.

As described above, detailed description has been given of the invention made by the inventors of the present invention with reference to the embodiment of the invention. However, the present invention should not necessarily be limited to the above-described embodiments and can be variously modified without departing from the spirit of the present invention.

For example, since it is necessary to increase the diameter of the rotary disc 5 as much as possible, the powder contact portion 7a of the stator 7 is made substantially vertical. However, it does not exclude that this is formed to provide a slightly curved portion to the extent where the connection with the rotary disc 5 is made smooth, and the latter is also included within the scope of the present invention. Further, as for the shape of a portion of the inner wall other than the powder contact portion 7a of the stator 7, this portion has no relation to the centrifugal tumbling action of the powder or granular material 2, any optional shape can be adopted, and, for example, this portion may be connected to a bag filter receiving portion having an enlarged diameter like a fluidized bed type granulating apparatus. However, as described above, the powder contact portion 7a is required to be substantially vertical. For example, making the top portion thereof formed to provide an inwardly curved surface produces a frictional resistance when the powder or granular material is pushed upwardly, and moreover, a volume for receiving the powder or granular material is decreased, so that it is not preferable.

The annular slit 12 formed between the rotary disc 5 and the stator 7 is required to be narrow in order to prevent the powder or granular material 2 from falling. However, the width of the annular slit 12 may be desirably set as far as the function for preventing the falling of powder or granular material 2 can be performed.

Then, the powder or granular material granulating-coating technique shown in the present invention is applicable to manufacturing spherical granules used as cores of pharmaceuticals (trade name—NONPAREIL manufactured by Freund Industrial Co., Ltd.), manufacturing pharmaceuticals such as sustained release drugs, entric coated tablets and the like, in which the above-described spherical granules are used, or manufacturing spherical granule-shaped pharmaceuticals, and applicable to manufacturing food materials used for spherical foods and toppings.

EXAMPLE

From the centrifugal tumbling granulating-coating apparatus shown in FIG. 1, such a centrifugal tumbling granulating-coating apparatus was constructed that the inner diameter of the cylindrical stator (fixed wall) was 300 mm, the diameter D of the rotary disc was 299 mm, the height H of the annular outer portion (inclined portion) was 45 mm, the size (P) of the outer portion in the horizontal direction was 84 mm, the raised portion was conical, the diameter of the central portion, i.e., the bottom surface portion was 50 mm, and the height from the surface of installation was 50 mm.

Into this apparatus, 1500 g of NONPAREIL 101, a trade name for spherical granules, in which sucrose and starch were mixed (30 to 40 mesh) (manufactured by Freund Industrial Co., Ltd.) was charged, the rotary disc was rotated at the rate of 300 RPM while the air was fed through the slit formed between the rotary disc and the stator (fixed wall) at the rate of 250 l/min. A water solution of 500 ml of 5 wt. % of hydroxypropylcellulose HPC-L (manufactured by Nippon Soda Co., Ltd.) was sprayed while the mixed powder of 2450 g of lactose and 1050 g of corn starch was spread in the apparatus. The spread of the aforesaid powder and the spray of the solution required 40 min.

With this operation, lactose was uniformly adhered onto the particles of the charged NONPAREIL 101, and about 5000 g of the uniform spherical granules being of 22 to 32 mesh was obtained. Adhesion of the powder or granular material to the stator (fixed wall) and the rotary disc was not observed.

COMPARATIVE EXAMPLE 1

Figure 5:
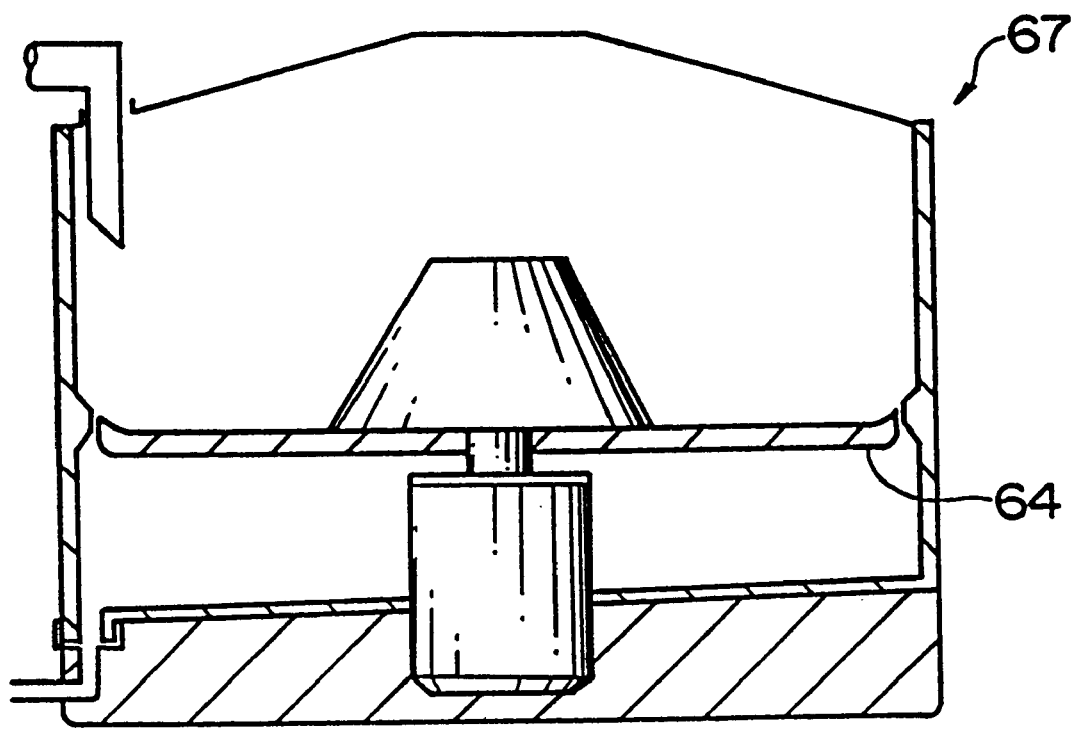
FIG. 5 is a sectional view showing an example of the conventional centrifugal tumbling granulating-coating apparatus.
Figure 6:
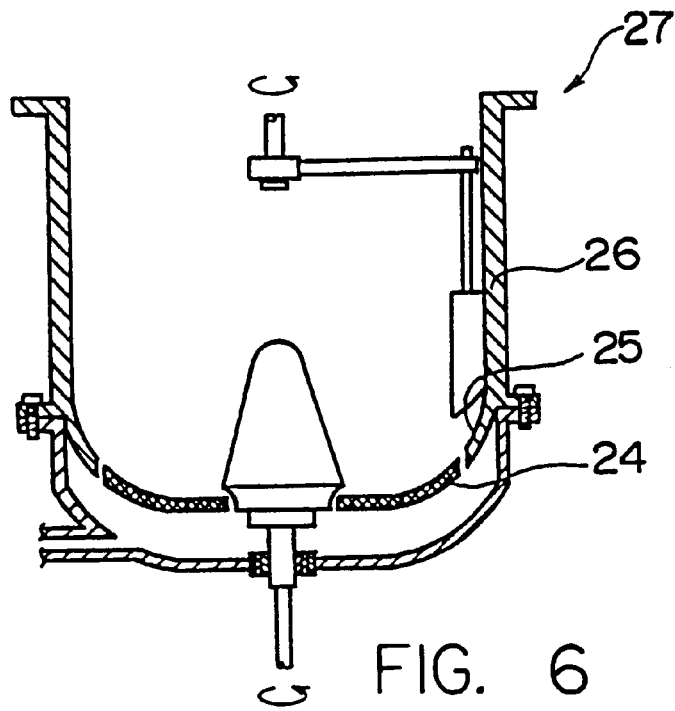
FIG. 6 is a sectional view showing another example of the conventional centrifugal tumbling granulating-coating apparatus.
Figure 7:
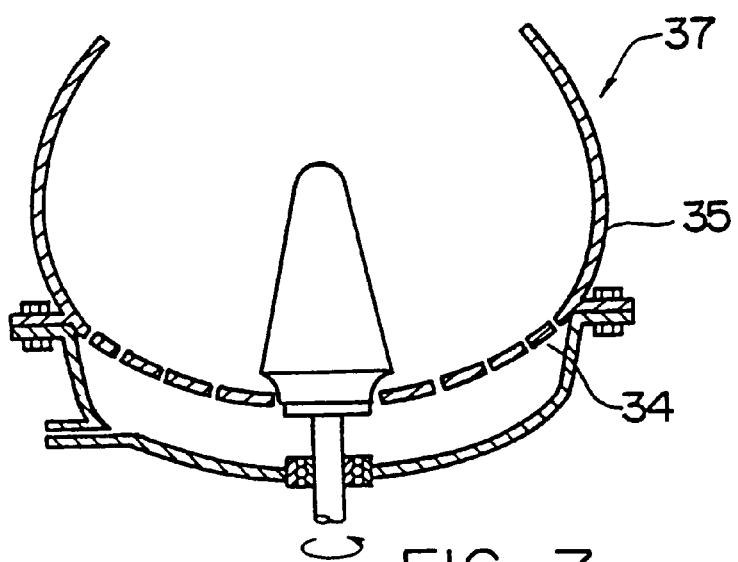
FIG. 7 is a sectional view showing a further example of the conventional centrifugal tumbling granulating-coating apparatus.
Figure 8:
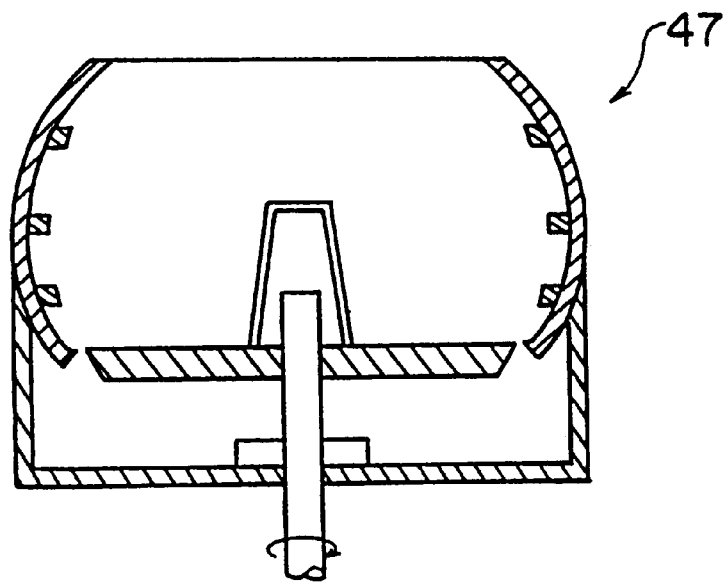
FIG. 8 is a sectional view showing a still further example of the conventional centrifugal tumbling granulating-coating apparatus.
Figure 9:
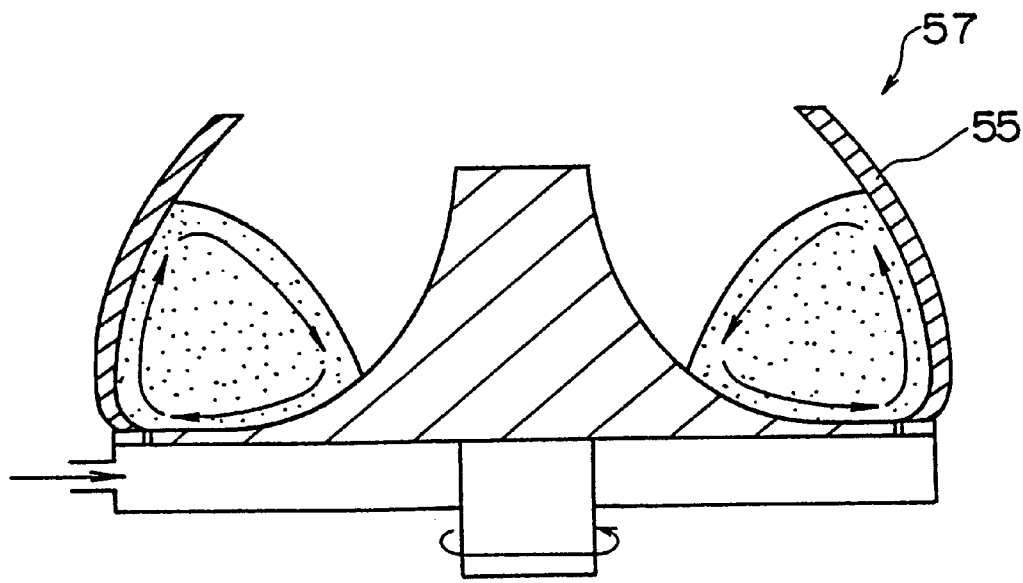
FIG. 9 is a sectional view showing a yet further example of the conventional centrifugal tumbling granulating-coating apparatus.

As the conventional type centrifugal tumbling granulating-coating apparatus, one shown in FIG. 5, in which the diameter of the inner wall of the stator (fixed wall) was 300 mm, was used, and, except for the above description, the construction and operation were identical with ones in the above-described embodiment. In this comparative example, the state of tumbling of the powder or granular material was unsatisfactory, the thickness of the layers of lactose on the spherical granules were not uniform, and the sphericalness was unsatisfactory. In order to obtain the satisfactory spherical granules, it was necessary to reduce the quantity to be treated to about 3000 g (900 g as the charge amount of NONPAREIL) at the finish.

COMPARATIVE EXAMPLE 2

Figure 10:
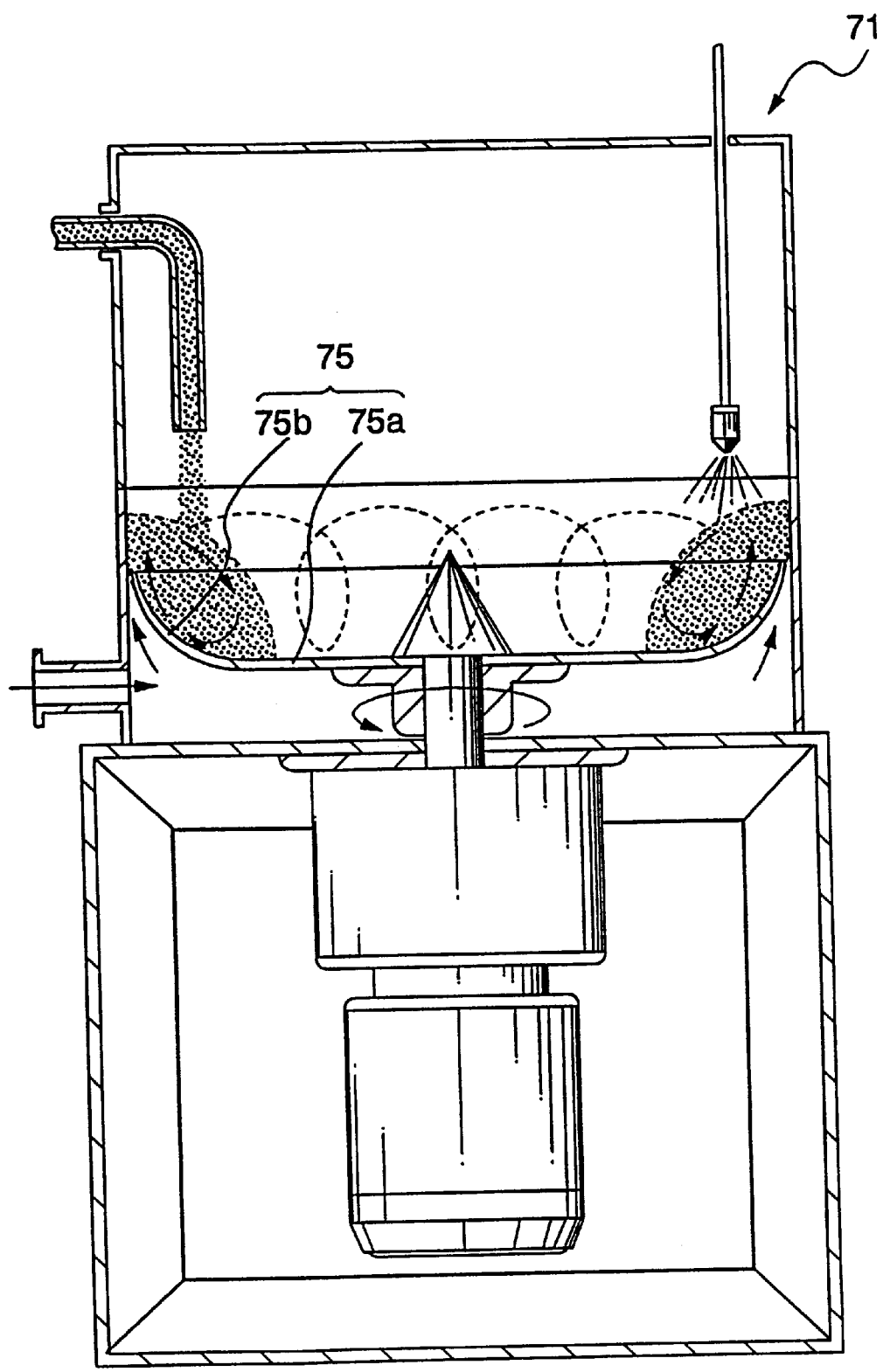
FIG. 10 is a sectional view showing a still yet further example of the conventional centrifugal tumbling granulating-coating apparatus.

As the conventional type centrifugal tumbling granulating-coating apparatus, one shown in FIG. 10, in which the diameter of the inner wall of the stator (fixed wall) was 300 mm, was used, and, except for the above description, the construction and operation were identical with ones in the above-described embodiment. In this comparative example, the produced spherical granules were satisfactory. However, the spherical granules and the powder of lactose were adhered and accumulated onto the curved portion of the rotary disc. For this, the yield was reduced to about 4500 g, and the rotary disc was needed to be cleaned after the use.

The following is the brief description of the results obtained by the typical ones out of the inventions disclosed in the present invention.

(1) According to the present invention, the outer portion of the rotary disc is formed to provide the inclined portion which is inclined downwardly toward the center, the size (P) of the outer portion thereof in the horizontal direction is within the range of $P \geq 0.25D$ and preferably $0.4D \geq P \geq 0.25D$ to the diameter (D) and the height (H) is within the range of $0.1D \leq H \leq 0.33D$ and preferably $0.1D \leq H \leq 0.25D$, so that the powder or granular material can be prevented from being adhered and accumulated onto the outer portion of the rotary disc.

(2) By the above-described (1), the centrifugal force effective for centrifugally tumbling the powder or granular material to be treated on the rotary disc can be obtained satisfactorily and granulating and coating can be performed efficiently.

(3) By the above-described (1) and (2), the granulated and coated products of high quality can be obtained.

(4) The outer portion of the rotary disc is the circularly arcuate shape which is convexed downwardly and the radius of curvature (R) is within the range of $R \geq 0.25D$ and preferably $R \geq D$, so that the powder or granular material can be prevented from being adhered and accumulated onto the rotary disc.

(5) The raised portion is provided at the central position of the rotary disc, so that the strength of the central portion of the rotary disc can be increased.

(6) Granulating and coating are performed while the gas is fed through the annular slit formed between the rotary disc and the fixed wall, so that the powder or granular material can be prevented from falling downwardly of the rotary disc through the slit and the lower side portion of the rotary disc can be held clean.

(7) The whole of the rotary disc is formed to provide the inverted conical shape which is downwardly inclined toward the center, so that the powder or granular material can be prevented from being adhered, and the efficient granulating and coating can be performed.

(8) The central portion itself of the rotary disc is formed integrally with the annular outer portion of the rotary disc as the raised portion, so that the strength of the rotary disc can be increased without providing the raised portion separately of the rotary disc.

What is claimd is:

1. A centrifugal tumbling granulating-coating apparatus wherein a powder or granular material consisting of small particles is charged into a centrifugal tumbling chamber and granulated or coated, said apparatus comprising: a rotary disc rotatable in the horizontal direction by a rotatably driving means; and a cylindrical fixed wall provided around the outside of said rotary disc at a predetermined distance, said cylindrical fixed wall having a substantially vertically extending portion contacted by the powder or granular material during centrifugal tumbling of said material arising from rotation of said rotary disc, said rotary disc in a vertical cross-section having a radially outer portion whose size (P) in the horizontal direction is within the range of $P \geq 0.25D$ in relation to the diameter (D) of the rotary disc, said outer portion of the rotary disc being inclined downwardly toward the center of the disc and having a height (H) within the range of $0.1D \leq H \leq 0.33D$ in relation to said diameter (D).

2. A centrifugal tumbling granulating-coating apparatus as set forth in claim 1, wherein the height (H) of said inclined outer portion is within the range of $0.1D \leq H \leq 0.25D$ in relation to said diameter (D).

3. A centrifugal tumbling granulating-coating apparatus as set forth in claim 1, wherein the size (P) of said inclined outer portion in the horizontal direction is within the range of $0.4D \leq P \leq 0.25D$ in relation to said diameter (D).

4. A centrifugal tumbling granulating-coating apparatus as set forth in claim 1, wherein said inclined outer portion in vertical cross-section is of straight line shape.

5. A centrifugal tumbling granulating-coating apparatus as set forth in claim 1, wherein said inclined outer portion in vertical cross-section has a circularly arcuate shape convexed downwardly with a radius of curvature (R) within the range of $R \geq 0.5D$.

6. A centrifugal tumbling granulating-coating apparatus as set forth in claim 5, wherein the radius of curvature (R) of said circularly arcuate shape is within the range of $R \geq D$.

7. A centrifugal tumbling granulating-coating apparatus as set forth in claim 1, wherein said rotary disc includes said outer portion and a central portion positioned at the inside of said outer portion, and said central portion in vertical cross-section is flat.

8. A centrifugal tumbling granulating-coating apparatus as set forth in claim 7, wherein a raised portion is formed at a central position of said rotary disc.

9. A centrifugal tumbling granulating-coating apparatus as set forth in claim 8, wherein said raised portion is formed integrally with said outer portion of said rotary disc.

10. A centrifugal tumbling granulating-coating apparatus as set forth in claim 7, wherein said rotary disc has an inverted conical shape inclined downwardly toward its center.

11. A method of granulating a powder or granular material, said method comprising the steps of:

providing a centrifugal tumbling granulating-coating apparatus as defined in claim 1, charging into said centrifugal tumbling granulating-coating apparatus a charge of powder or granular material consisting of small particles, feeding a binding agent, or a solution of binding agent and powder, into said centrifugal tumbling granulating-coating apparatus while rotating said rotary disc, so that the particles of the powder or granular material are bound with each other to form granules each made up of a large number of said particles.

12. A method of granulating a powder or granular material as set forth in claim 11, and further comprising the step of feeding a gas through an annular slit formed between said rotary disc and said fixed wall.

13. A method of coating a powder or granular material, said method comprising the steps of:

providing a centrifugal tumbling granulating-coating apparatus as defined in claim 1, feeding into said centrifugal tumbling granulating-coating apparatus a powder or granular material consisting of small particles and a coating agent or a solution of coating agent and of said powder or granular material while rotating said rotary disc, so that coating layers are formed on particles of the powder or granular material.

14. A method of coating a powder or granular material as set forth in claim 13, wherein said forming of coating layers is performed while feeding a gas through an annular slit formed between said rotary disc and said fixed wall.

* * * * *